Oct. 18, 1955     D. D. ZEBLEY     2,720,792
CONVEYOR SPROCKET WHEEL
Filed April 22, 1953
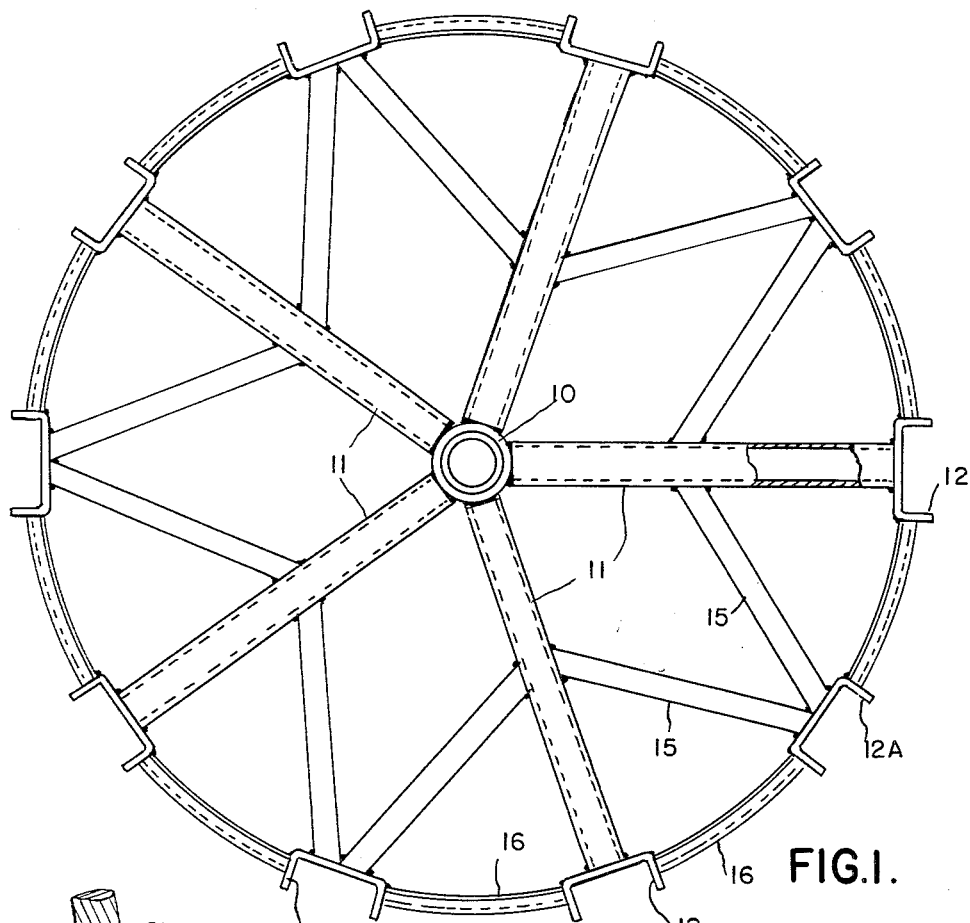
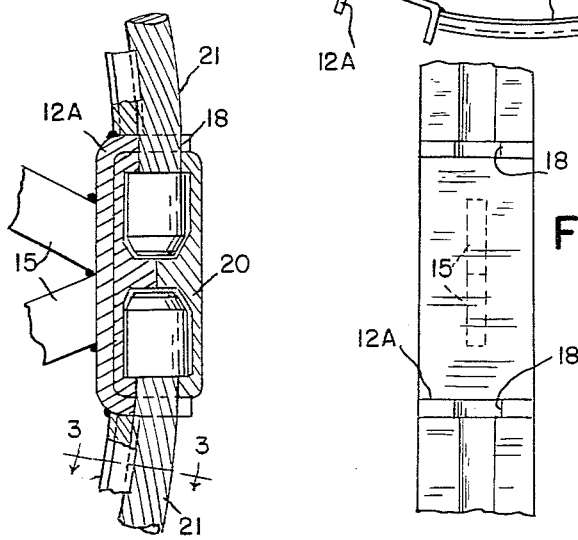
FIG.2.
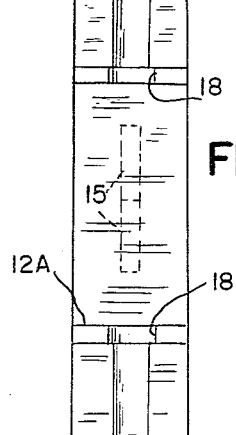
FIG.3.
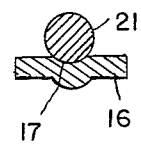
FIG.4.
*INVENTOR.*
DONALD D. ZEBLEY
BY *Hauke & Hardesty*
ATTORNEYS

United States Patent Office 2,720,792
Patented Oct. 18, 1955

2,720,792

CONVEYOR SPROCKET WHEEL

Donald D. Zebley, Detroit, Mich.

Application April 22, 1953, Serial No. 350,350

2 Claims. (Cl. 74—243)

The present invention relates to sprocket wheels for conveyors of the type wherein the transported loads are suspended from uniformly spaced trolley brackets and pulled along on a suitable track by flexible links.

Among the objects of the invention is to provide a sprocket wheel which is more reliable and less subject to breakage than those usually used.

Another object is a wheel that is lighter and stronger than the conventional wheel.

Still other objects and advantages will readily occur to those skilled in the art upon reference to the following description and the accompanying drawings in which:

Fig. 1 is a view in elevation of a wheel produced in accordance with the present invention.

Fig. 2 is a partial view looking at the outer rim of the wheel.

Fig. 3 is a sectional view on line 3—3 of Fig. 4.

Fig. 4 is a partial side view showing in section one of the trolley brackets in one of the cross channel members.

As shown in the drawing, a wheel produced under the invention comprises a tubular hub 10 having a plurality of tubular spokes 11 welded thereto with each of the spokes carrying welded to its outer end a sheet metal channel member 12, the axis of which is normal to the plane of the wheel.

Additional channels 12A, identical with channels 12, are spaced evenly between the latter and supported upon diagonally arranged bars 15 welded to the tubular spokes 11 intermediate their length and to the channels 12A. Each channel 12A is supported from two adjacent spokes 11.

Between the channels 12 and 12A and welded thereto are rim sections 16 a cross section of one of which, shown in Fig. 3, shows it to be a bar in which is rolled, or otherwise produced, a shallow rounded groove 17.

The channels 12 and 12A are preferably of rather heavy sheet metal and in each side wall is provided a notch 18, the bottom of which is semicircular and arranged with its center point aligned with the center of the rounded groove 17 in the adjacent rim member 16.

The wheel as shown has been designed for use particularly with conveyors in which the flexible linkage between trolleys is of cable, but with suitable modification can be used with any conventional linkage.

Figs. 3 and 4 show the use of the wheel with a cable link conveyor.

In Fig. 4 a section of a trolley bracket is shown at 20 as fitting snugly in one of the channels 12A with its cable links 21 extending through notches 18 and along the grooved rim members 16 in the groove 17, as indicated in Fig. 3.

I claim:

1. A sprocket wheel for conveyors consisting of a hub member having welded thereto a plurality of tubular spokes each having fixed at its outer end a channel member extending transversely, a similar channel member similarly arranged and spaced evenly between each two of the first mentioned channel members, supporting members for the intermediate channel members fixed thereto and to the tubular spokes, and arcuate rim members fixed between adjacent channel members, said rim members each being provided with an arcuate groove in its outer face and said channel members each having notches in its side walls registering with said grooves.

2. A sprocket wheel for conveyors comprising a hub member having welded thereto tubular spokes, transversely arranged shallow channel members fixed to the ends of said spokes, a channel member intermediate each two of the first mentioned channel members, said channel members being evenly spaced and similarly arranged, diagonally arranged supports extending from said intermediate channel members to said spokes and fixed to the latter intermediate their length, and arcuate rim members extending between and fixed to the side walls of said channel members.

References Cited in the file of this patent

UNITED STATES PATENTS

| 1,421,832 | Riley | July 4, 1922 |
| 2,443,947 | Brooks et al. | June 22, 1948 |